(12) United States Patent
Neundorf (10) Patent No.: US 11,834,888 B2
(45) Date of Patent: Dec. 5, 2023

(54) DRIVE ASSEMBLY OF A MOTOR VEHICLE

(71) Applicant: Brose Fahrzeugteile SE & Co. Kommanditgesellschaft, Bamberg, Bamberg (DE)

(72) Inventor: Robert Neundorf, Ebersdorf (DE)

(73) Assignee: BROSE FAHRZEUGTEILE SE & CO. KOMMANDITGESELLSCHAFT, BAMBERG, Bamberg (DE)

(*) Notice: Subject to any disclaimer, the term of this patent is extended or adjusted under 35 U.S.C. 154(b) by 529 days.

(21) Appl. No.: 17/260,728

(22) PCT Filed: Jul. 17, 2019

(86) PCT No.: PCT/EP2019/069249
§ 371 (c)(1),
(2) Date: Mar. 4, 2021

(87) PCT Pub. No.: WO2020/016300
PCT Pub. Date: Jan. 23, 2020

(65) Prior Publication Data
US 2021/0270076 A1    Sep. 2, 2021

(30) Foreign Application Priority Data

Jul. 18, 2018   (DE) .................... 10 2018 117 413.6

(51) Int. Cl.
  *E05F 15/622* (2015.01)
  *F16H 25/20* (2006.01)
(52) U.S. Cl.
  CPC ......... *E05F 15/622* (2015.01); *F16H 25/205* (2013.01); *E05Y 2600/626* (2013.01);
  (Continued)

(58) Field of Classification Search
  CPC .................. E05F 15/622; F16H 25/205; F16H 2025/2037; F16H 2025/2081;
  (Continued)

(56) References Cited

U.S. PATENT DOCUMENTS 7,226,111 B2 *  6/2007  Berklich, Jr. ......... E05F 15/622
                                                    49/343
2007/0261310 A1  11/2007  Porat et al.
(Continued)

FOREIGN PATENT DOCUMENTS

DE    112012003117 T5    4/2014
DE    102017205605 A1    10/2017
(Continued)

*Primary Examiner* — Pinel E Romain
(74) *Attorney, Agent, or Firm* — Dickinson Wright PLLC (57) ABSTRACT

A drive assembly of a motor vehicle for the motor-driven adjustment of a flap, in particular a side door, of the motor vehicle by means of linear drive movements, wherein the drive assembly has a drive unit for generating the linear drive movements, which is assigned a drive with at least one drive motor and a feed transmission, in particular a spindle/-spindle nut transmission, that is drivingly connected to the drive. The drive assembly has a support structure which receives the drive unit such that it can swivel about a geometric supporting swivel shaft, such that the drive unit and the support structure are connected to form a pre-assembly unit which can be mounted as such via the support structure in a mounting position on the motor vehicle, in particular on the flap or on the motor vehicle body.

20 Claims, 4 Drawing Sheets

(52) U.S. Cl.
CPC ... *E05Y 2800/205* (2013.01); *E05Y 2800/242* (2013.01); *E05Y 2900/531* (2013.01); *F16H 2025/2037* (2013.01); *F16H 2025/2081* (2013.01)

(58) Field of Classification Search
CPC ......... E05Y 2600/626; E05Y 2800/205; E05Y 2800/242; E05Y 2900/531; E05Y 2600/63; E05Y 2800/21
USPC ..................................................... 296/146.4
See application file for complete search history.

(56) References Cited

U.S. PATENT DOCUMENTS

| | | | |
|---|---|---|---|
| 2016/0144694 A1* | 5/2016 | Shchokin | B60J 5/107 475/331 |
| 2017/0292310 A1 | 10/2017 | Podkopayev | |
| 2019/0106925 A1* | 4/2019 | McCorkell | F16H 25/24 |

FOREIGN PATENT DOCUMENTS

| | | | |
|---|---|---|---|
| EP | 1795685 B1 | 4/2016 | |
| EP | 3299561 A1 | 3/2018 | |

* cited by examiner

DRIVE ASSEMBLY OF A MOTOR VEHICLE

CROSS-REFERENCE TO RELATED APPLICATIONS

This application is the U.S. National Phase of PCT Application No. PCT/EP2019/069249 filed Jul. 17, 2019, which claims priority to German Patent Application No. DE 10 2018 117 413.6 filed Jul. 18, 2018, the disclosures of which are hereby incorporated in their entirety by reference herein.

TECHNICAL FIELD

The present disclosure relates to a drive assembly for a motor vehicle.

BACKGROUND

The drive assembly being discussed is used in the context of the motorized adjustment of any kind of hatches of a motor vehicle. These hatches can be, for example, side doors, rear hatches, rear lids, engine bonnets, or load compartment floors of a motor vehicle. To this extent the term "hatch" is to be understood in a wide context.

SUMMARY

The present disclosure may be based on one or more objects such as designing and refining the known drive assembly such that the latter better meets the practical requirements in the automotive sector.

According to one or more embodiments, a concept of providing a drive assembly with a support structure which pivotably receives a drive unit, is provided. The drive unit may include a drive having at least one drive motor and a thrust gearbox. Particularly easy assembling is enabled on account of the support structure and the drive unit being connected so as to form a preassembled unit. On account of the support structure it additionally becomes possible for a supporting pivot axis to be positioned independently of the fastening on the motor vehicle, on account of which the supporting pivot axis can already be established during production and independently of the fastening on the motor vehicle. Greater freedoms in terms of predefining the position of the supporting pivot axis are additionally created on account thereof, while the drive assembly overall can be produced in a cost-effective manner with consistent quality.

As an example, the drive assembly may include a support structure which receives the drive unit so as to be pivotable about a geometric supporting pivot axis, and that the drive unit and the support structure are connected so as to form a preassembled unit which per se, by way of the support structure, is able to be assembled on an assembly location on the motor vehicle, such as on the hatch or the motor vehicle body.

In another embodiment, the drive is assigned a geometric drive axis along which various components can extend. An advantageous adaption of the drive assembly to the conditions in the motor vehicle can thus be performed.

According to a another embodiment, the drive and the thrust gearbox can be received by a drive housing which for configuring the preassembled unit is connected to the support structure. Particularly easy handling while assembling is achieved on account thereof.

In one or more embodiments, the drive and the thrust gearbox run beside one another along the drive axis. The axial extent of the drive assembly can be massively reduced on account thereof.

When two drive motors are provided, the drive shafts thereof can thus extend so as to be beside one another along the drive axis in a particularly advantageous manner. Since both drive motors can be of a smaller design in the case of two drive motors being used, the compactness of the drive assembly can be further enhanced.

According to one or more embodiments, the drive motors can be designed so as to have dissimilar nominal torques and/or by way of a coupling gearbox be coupled to the thrust gearbox at dissimilar gear ratios, on account of which an efficient operation of the drive assembly is made possible at different operating points in terms of rotation speed and torque.

According to another embodiment, a manner of coupling the drive assembly to the hatch or the motor vehicle body in order for the linear drive movement to be discharged, is provided.

Since the flexible geometric basic design potential of the drive assembly is of particular relevance, the supporting pivot axis may be disposed in a central or rear region of the drive housing and thus spaced apart from the assembly location of the support structure. This spacing controls the effective leverage forces and the space requirement by pivoting the drive housing in relation to the support structure.

Various advantageous variants are conceivable for the basic design of the support structure. The support structure may have at least one support arm or two support arms, and a base arm which may be able to be assembled on the motor vehicle. A compact, stable, bracket-shaped support structure can be created on account thereof. In another embodiment, the support structure at least partially encloses the drive unit, this leading to an overall compact assembly.

In one or more embodiments, a hatch assembly of a motor vehicle having a hatch and a drive assembly is provided. Reference may be made to all explanations pertaining to the drive assembly according to the proposal.

According to yet another embodiment, the drive assembly of the hatch assembly is assembled on the end side of the hatch by way of the support structure. This is particularly advantageous when the end side of the hatch is designed so as to be more stable in comparison to an outer skin of the hatch.

According to another embodiment, a method for assembling a drive assembly is provided. Reference may be made to all explanations pertaining to the drive assembly and the hatch assembly according to the proposal.

BRIEF DESCRIPTION OF THE DRAWINGS

The invention will be explained in more detail hereunder by means of a drawing which illustrates only one exemplary embodiment. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The known drive assembly (EP 1 795 685 B1) from which the invention proceeds has a thrust gearbox and a drive motor behind one another along a drive axis. This drive assembly by one end is pivotably fastened to a body of the motor vehicle, and by the other end is pivotably fastened to a hatch, such as a door, of the motor vehicle. The drive assembly generates linear drive movements by means of which the motor vehicle door can be opened and closed in a motorized manner.

While the known drive assembly is readily suitable for adjusting a hatch in a motorized manner, there is inter alia potential in terms of optimizing the installation space. On the one hand, the drive assembly is of a very long construction, and the respective motor vehicle door for fastening must have a pivot joint, on the other hand. Additionally, the motor vehicle door has to be reinforced in the region of the pivot joint in order to absorb the forces generated by the drive assembly. To this end, a side skin of the motor vehicle door has to be specifically reinforced. Since other components that are present in the hatch moreover have to be disposed about the drive, this drive assembly meets the practical requirements in the automotive sector only to a limited extent.

An approach toward solving at least one of these issues is provided by DE 11 2012 003 117 T5 in which a drive assembly which by way of one end is also pivotably fastened to the body, the second fastening of the drive assembly however being situated on a motor-vehicle-proximal end side of the door so that the rear end is freely floating, is disclosed.

The drive assembly herein is pivotably mounted on the end side on account of a joint which is formed while assembling. On account of the assembly location in the front region providing the joint, the drive assembly pivots to a great extent in the rear region and is exposed to the effects of high leverage. The consistent production of a stable joint while assembling is expensive and inefficient, and thus does not correspond to the practical requirements in the automotive sector.

Figure 1:
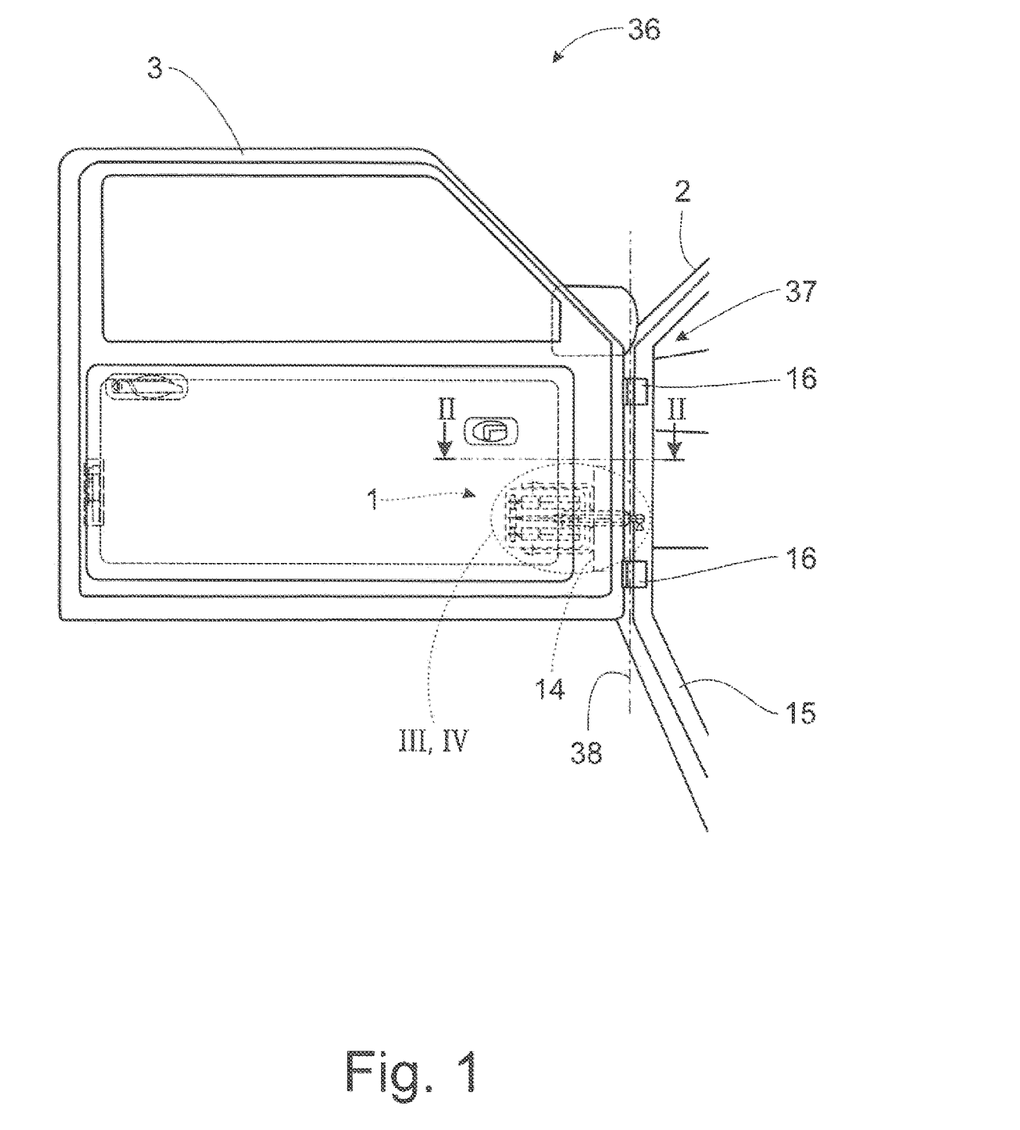
FIG. 1 shows a drive assembly in the assembled state in a motor vehicle door.

The drive assembly 1 of a motor vehicle 2 illustrated in FIG. 1 serves for the motorized adjustment of a hatch 3, such as a side door, of the motor vehicle 2 by means of linear drive movements. In very general terms, a hatch 3 herein is a component of a motor vehicle 2 that can release and close an opening of the motor vehicle 2. The hatch 3 may be a side door of the motor vehicle 2. In terms of further examples of hatches, reference is made to the introductory part of the description.

The hatch 3 illustrated can in principle be adjusted in a manual and motorized manner. In this case, the hatch 3 is adjustable by means of linear drive movements. The drive assembly 1 has a drive unit 4 for generating the linear drive movements. This drive unit 4 is assigned a drive 5 having at least one drive motor 6. The drive motor 6 here is an electric motor, such as a brush-type DC motor.

The drive unit 4 is furthermore assigned a thrust gearbox 7, such as a spindle/spindle nut gearbox 8, that in terms of drive technology is coupled to the drive 5. The drive 5 here, by way of the at least one drive motor 6, generates rotation movements which are converted to linear drive movements by the thrust gearbox 7.

According to the proposal, the drive assembly 1 now has a support structure 9 which receives the drive unit 4 so as to be pivotable about a geometric supporting pivot axis 10. The geometric supporting pivot axis 10 in this exemplary embodiment is formed by two pivot bearings 11, 12.

It is now furthermore proposed that the drive unit 4 and the support structure 9 are connected so as to form a preassembled unit 13. This connection can be permanent or temporary, that is to say that the preassembled unit 13 is indeed connected when assembling starts on the motor vehicle 2, but potentially may not be disassembled when connected.

The drive unit 4 and the support structure 9 here may be connected so as to form the preassembled unit 13 by way of the pivot bearings 11, 12. The preassembled unit 13 per se, by way of the support structure 9, is able to be assembled, for example screw-fitted, on an assembly location 14 on the motor vehicle 2, such as on the hatch 3 or on a motor vehicle body 15. The support structure 9 in this instance can be simply screwed to the hatch 3 or the motor vehicle body 15 in one assembling step, for example. For the sake of simplicity below, the explanations in most instances relate only to a preassembled unit 13 that is connected to a hatch 3, but the explanations likewise apply also to a preassembled unit 13 that is connected to the motor vehicle body 15.

Figure 2:
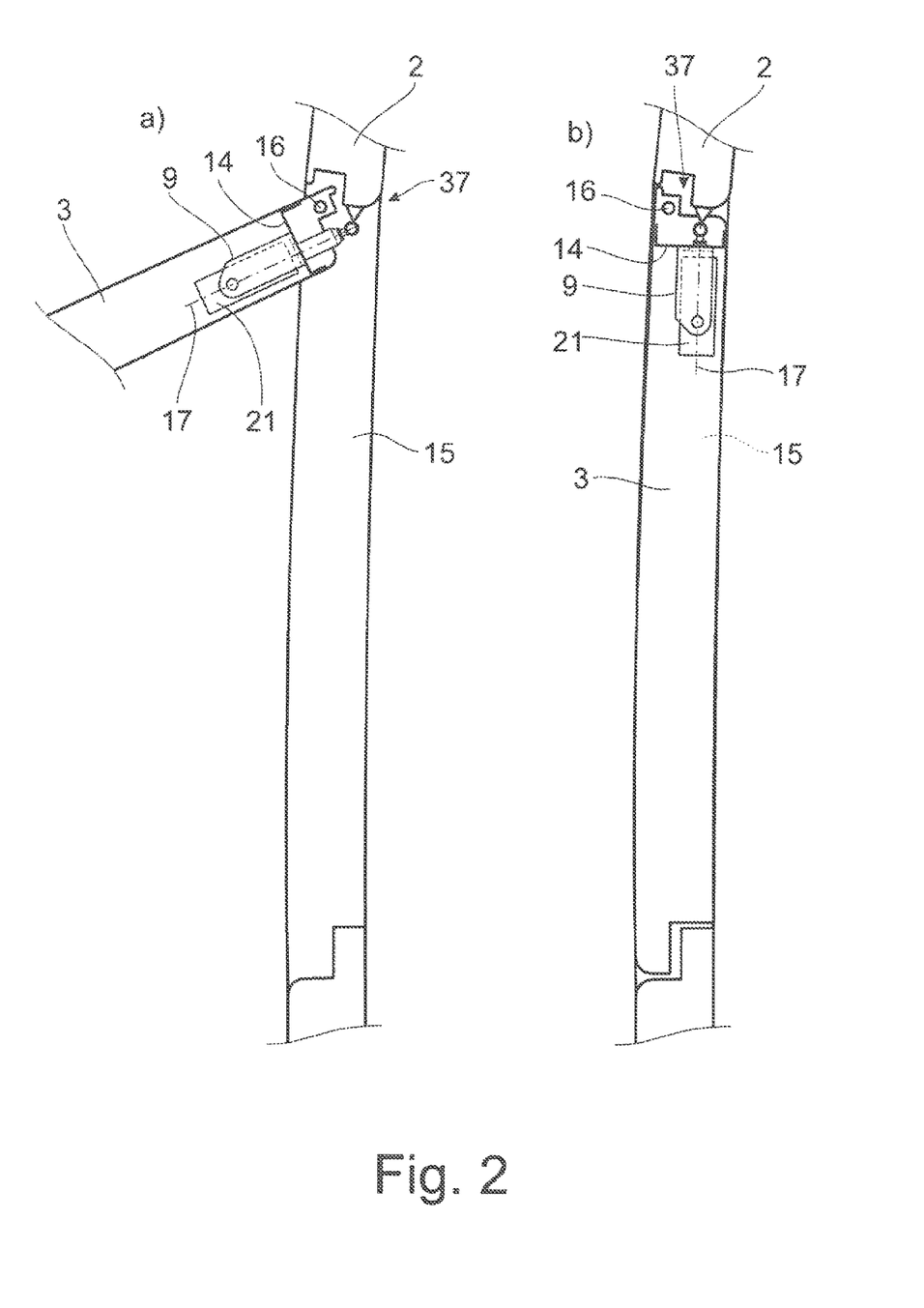
FIG. 2 shows a plan view of the motor vehicle door along the section II-II in an opened and a closed state.

FIG. 2 now shows a plan view of a hatch 3, here a motor vehicle door, along the section II-II. An adjustment of the motor vehicle door takes place in that the thrust gearbox 7 generates the linear drive movements in that the thrust gearbox 7 is deployed (FIG. 2a)) or retracted (FIG. 2b)). This here takes place very specifically in that the thrust gearbox 7 pushes the motor vehicle door away from the motor vehicle body 15 so as to pivot about a door joint 16.

Figure 3:
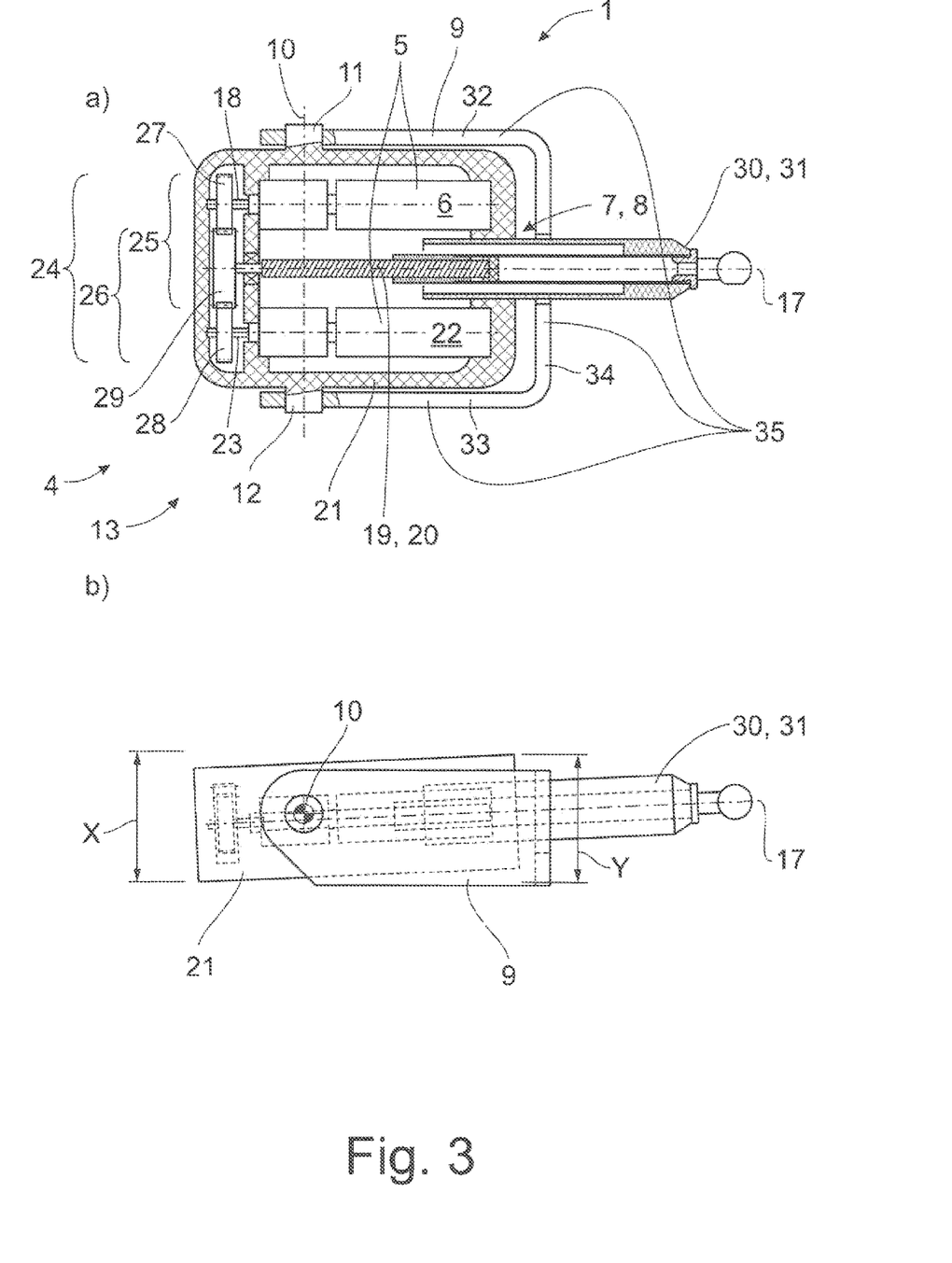
FIG. 3 shows the drive assembly in a state in which the thrust gearbox is deployed.
Figure 4:
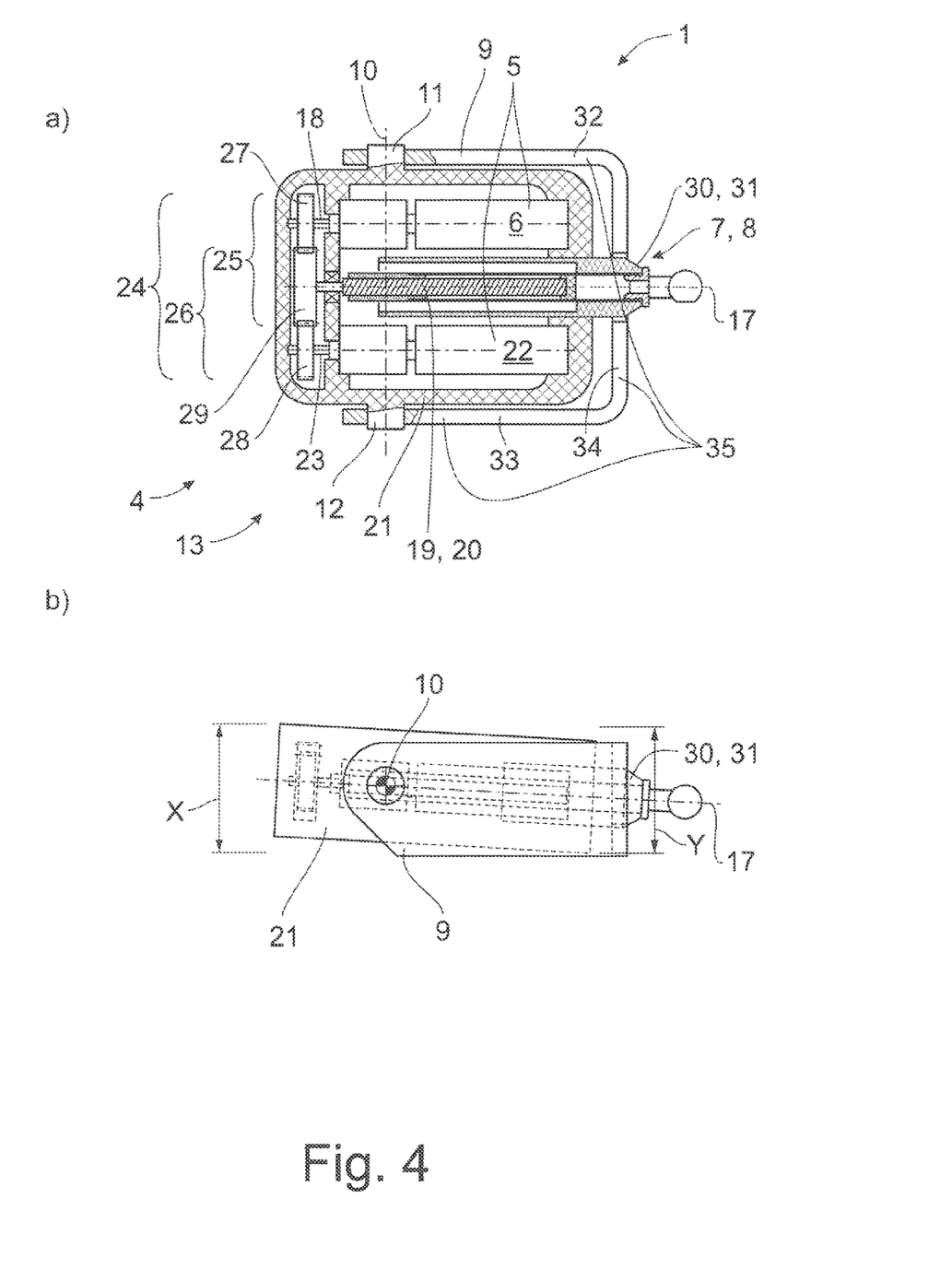
FIG. 4 shows the drive assembly in a state in which the thrust gearbox is retracted.

FIGS. 3 and 4 show another embodiment of the drive assembly 1. As is illustrated therein, the drive 5 is in very general terms assigned a geometric drive axis 17. The geometric drive axis 17 is particularly preferably defined by the direction of the linear drive movements. The geometric drive axis 17 may run along a thrust direction of the thrust gearbox 7.

With a view to a relatively simple basic design in terms of construction, the at least one drive motor 6, such as a drive shaft 18 of the at least one drive motor 6 of the drive 5, can extend along the drive axis 17, such as so as to be parallel to the drive axis 17. The term "along" is presently always to be understood in a wide context and means that the respective element, for example the drive shaft 18, is at an angle of less than 45° in relation to the drive axis 17 and is thus aligned in the direction of the drive axis 17 more than in any direction orthogonal to the latter.

In terms of the disposal of the thrust gearbox 7 relative to the drive 5, such as, relative to the at least one drive motor 6, it is moreover provided that a thrust element 19 of the thrust gearbox 7, such as a spindle 20 of the spindle/spindle nut gearbox 8, extends along the drive axis 17 of the drive 5, such as so as to be parallel to the drive axis 17 of the drive 5. Unless the drive axis 17 is not defined by the linear drive movements, the linear drive movements furthermore may extend along the drive axis 17 of the drive 5, so as to be parallel to the drive axis 17 of the drive 5.

In order for the drive assembly 1 to be designed to be robust and easy to handle in the context of assembling, the drive unit 3 may include a drive housing 21 having a longitudinal extent along the drive axis 17. The drive housing 21 receives the drive 5 and the thrust gearbox 7. The drive housing 21 is then connected to the support structure 9 so as to form the preassembled unit 13. This connection may be provided by way of the pivot bearings 11, 12. Other variants for this connection, such as only for the variants provided for the assembling, are conceivable.

The drive housing 21 can be embodied in two parts or multiple parts. The drive housing 21 may be embodied in a shell construction mode. The drive housing 21 will normally have at least one opening for the thrust element 19.

In terms of the alignment of the components of the drive unit 4, the drive 5 and the thrust element 19 of the thrust gearbox 7, such the spindle 20 of the spindle/spindle nut gearbox 8, may extend beside one another along the drive axis 17. As can be seen in FIGS. 3 and 4, this may manifest itself in that the at least one drive motor 6 of the drive 5 and the spindle 20 of the spindle/spindle nut gearbox 8 extend beside one another along the drive axis 17. The term "beside one another" herein means that the respective components are radially spaced apart in terms of the drive axis 17 and overlap along the axial direction in terms of the drive axis 17. The respective components herein overlap preferably by at least 50%, or by at least 75%, or by 100%, in terms of the respective shorter component. These percentage figures herein relate to a fully retracted state of the thrust gearbox 7. The extent of the drive assembly 1 can be significantly reduced, such as along the drive axis 17, by way of this design embodiment.

As is illustrated in the drawing, the drive 5 has at least one further drive motor 22, thus at least two drive motors 6, 22. All explanations pertaining to the one drive motor 6 apply in analogous manner to the further drive motor 22. Both these drive motors 6, 22 in terms of drive technology are coupled to the thrust gearbox 7. On account thereof, both drive motors can be conceived having a lower output and thus so as to be smaller and narrower. This further contributes towards optimizing the installation space of the drive assembly 1. It is provided that both drive motors 6, 22 can simultaneously drive the thrust gearbox 7. In principle however, it can also be provided that each of the two drive motors 6, 22 individually drives the thrust gearbox 7.

The drive shafts 18, 23 of the drive motors 6, 22 may extend along the drive axis 17, so as to be parallel to the drive axis 17. As is shown in FIGS. 3 and 4, both drive motors 6, 22 herein extend beside one another along the thrust gearbox 7. Moreover, the drive shafts 18, 23 of the drive motors 6, 22 may extend beside one another along the drive axis 17.

In order for the drive force from the drive motors 6, 22 to be directed into the thrust gearbox 7, the drive unit 4 may include an intermediate gearbox 24 which is correspondingly disposed between the drive motors 6, 22 and the thrust gearbox 7.

In the design embodiment illustrated, the drive motors 6, 22 and the thrust gearbox 7 lie in one plane, on account of which the drive assembly 1 can be embodied in a comparatively flat manner.

The use of two drive motors 6, 22 opens up entirely new possibilities in terms of utilizing the respective motor characteristic in an optimized manner. It can therefore be advantageous for the two drive motors 6, 22 to have dissimilar nominal outputs. However, the drive motors 6, 22 may be conceived for substantially identical nominal outputs, on account of which it is possible to operate in a cost-effective manner using identical types of drive motors. The two drive motors 6, 22 may be conceived so as to have a substantially identical nominal torque.

To the extent that the two drive motors 6, 22 are coupled to the thrust gearbox 7 in different ways, it is readily possible for both drive motors 6, 22 to be operated at different operating points despite the two drive motors 6, 22 such as being conceived so as to be substantially identical. On account thereof, the mechanical output to be in each case delivered can be set such that the resultant overall operation is as efficient as possible.

The above efficient overall operation may be implemented in that the two drive motors 6, 22 in terms of drive technology are in each case coupled to the thrust gearbox 7 by way of a coupling gearbox 25, 26. These coupling gearboxes 25, 26 can conjointly form the intermediate gearbox 24. In another embodiment, the coupling gearboxes 25, 26 are in each case spur gear units and in terms of drive technology may be coupled in each case to the spindle 20 of the spindle/spindle nut gearbox 8. In order for the efficient overall operation to be optimized, the two coupling gearboxes 25, 26 can have dissimilar gear ratios. In the specific exemplary embodiment this is implemented in that both drive motors 6, 22 in terms of drive technology are in each case coupled to one spur gear 27, 28 and both spur gears 27, 28 engage in a further spur gear 29 which in terms of drive technology is coupled to the thrust gearbox 7. In order for the dissimilar gear ratios to be implemented, the spur gears 27, 28 of the drive motors 6, 22 may include different numbers of teeth.

In order for the linear drive movements to be discharged, the thrust gearbox 7 preferably has an output connector 30. In order for the linear drive movements to be able to be discharged and converted to a pivoting movement of the hatch 3, the output connector 30 is able to be coupled in a pivoting manner to the motor vehicle body 15 or to the hatch 3. The output connector 30 is preferably designed as a thrust rod 31. Depending on whether it is provided that the hatch 3 can be operated in a motorized manner in two directions, the thrust rod 31 is conceived for transmitting compressive loads and/or tensile loads.

In the present exemplary embodiment the output connector 30 is, such as rigidly, connected to the spindle 20 of the spindle/spindle nut gearbox 8. This is easy to implement in terms of construction.

In the context of the flexibility in terms of construction which is inherent to the drive assembly 1 according to the proposal, the position of the supporting pivot axis 10 may be noteworthy. The supporting pivot axis 10 can be spaced apart from the assembly location 14 in a wide range, as required. Accordingly, it may be provided that the supporting pivot axis 10, when viewed along the drive axis 17, is disposed in a central region of the drive housing 21 that, when viewed along the drive axis 17, extends across less than 50% of the longitudinal extent of the drive housing 21.

On account of the centric positioning of the supporting pivot axis 10 which may be runs so as to be orthogonal to the drive axis 17, it is possible, for example, for the supporting pivot axis 10 to be positioned approximately level with the center of mass of the drive unit 4. On account thereof, torques which act on the connecting region between the support structure 9 and the drive unit 4 and are may be related to inertia can be avoided.

It is also possible for the supporting pivot axis 10, when viewed along the drive axis 17, to be disposed in a rear region of the drive housing 21. This may mean that the supporting pivot axis 10 is disposed so as to be spaced apart from the assembly location 14 by more than 25%, or by more than 50%, furthermore or by more than 75%, of the longitudinal extent of the drive housing 21.

A disposal in the rear region of the drive housing 21 has the advantage that pivoting X of the rear part of the drive housing 21 during the adjustment of the hatch 3 is reduced, on account of which a particularly flexible positioning of the drive assembly 1, may be within the hatch 3, results. On account thereof, the drive assembly 1 can be conceived in an optimal manner for the respective conditions. In this context, the preassembled unit 13 in general terms, when viewed along the drive axis 17, may include at least two attachment points, or three attachment points, for the supporting pivot axis 10 on the drive housing 21 such that one of the attachment points 10 can be utilized for the supporting pivot axis 10, depending on the customer requirements. Additional flexibility in terms of construction results on account thereof. The plurality of attachment points in this context can be implemented in that the pairs of pivot bearings 11, 12 are implemented as a total of three pairs of pivot bearings 11, 12 that are disposed so as to be offset along the drive axis 17.

In principle, the pivoting X of the rear part and the pivoting Y of the front part of the drive unit 4, or of the drive housing 21, respectively, can be set in an optimal manner to the respective predefined installation space by positioning the drive axis 17.

Various advantageous variants are conceivable in terms of the basic design of the support structure 9. For example, it is advantageous for the support structure 9 to have at least one support arm 32, 33. In the simplest case, a single pivot bearing for pivotably receiving the drive unit 4 can in this instance be disposed on this support arm 32, 33. As can be seen in the figures, the support structure 9 may include two support arms 32, 33 which may be aligned so as to be mutually parallel and/or aligned along the drive axis 17 and on which in each case one pivot bearing 11, 12 for pivotably receiving the drive unit 4 is disposed. A support structure 9 designed in such a manner enables the supporting pivot axis 10 to be flexibly positioned in a manner which is particularly simple in terms of construction.

The support structure 9 may be designed as a support frame 35, wherein the two support arms 32, 33 of the support structure 9 are connected to one another by way of a base arm 34. The support structure 9 is such as integrally configured, this may be advantageous in terms of production technology. However, it can also be advantageous for the support structure to be designed in two parts or multiple parts, for example, when cost-effective standard components are to be used.

The support frame 35 can in principle be designed so as to be open on one side in such a manner that the two support arms 32, 33 are in each case free on that end thereof that is opposite the base arm 34. Weight can thus be saved. Alternatively however, it is also conceivable for the support frame 35 to be designed so as to be closed such that a mechanically particular robust support structure 9 results.

The preassembled unit 13 may be able to be assembled on the motor vehicle 2, such as on the hatch 3 or the motor vehicle body 15, by way of the base arm 34. The assembling here in can take place in a force-fitting, form-fitting, or materially integral manner. It may be advantageous for the base arm 34 to be assembled on a reinforced location of the hatch 3 or the motor vehicle body 15.

It can moreover be provided that the support structure 9 at least partially encloses the drive unit 4. High stability and above all a high degree of compactness is guaranteed on account thereof. This functions particularly positively when the support arms 32, 33 conjointly with the base arm 34 form a bracket.

In one or more embodiments, a hatch assembly 35 having a hatch 3, such as a side door, of a motor vehicle 2 and a drive assembly 1 is provided. The drive assembly 1 herein is assembled on the hatch 3 or the motor vehicle body 15 by way of the support structure 9 of the drive assembly 1. Reference may be made to all explanations pertaining to the drive assembly 1 according to the proposal.

In one another embodiment, the hatch 3 on an end side 37 of the hatch 3 is articulated on the motor vehicle body 15 so as to be pivotable about a hatch pivot axis 38. Since this end side 37, in particular in the case of a motor vehicle door, is often reinforced, the drive assembly 1 according to the proposal in the hatch assembly 36 may be assembled on the end side 37 of the hatch 3 by way of the support structure 9 of the drive assembly 1. An output connector 30 of the drive assembly 1 that is designed as a thrust rod 31 may protrude through an opening in the end side 37 of the hatch 3 and is pivotably articulated on the motor vehicle body 15. This can best be derived from the illustration according to FIG. 2.

According to a further teaching, is a method for assembling a drive assembly 1 according to the proposal on a hatch 3, in particular a side door, of a motor vehicle 2, wherein the preassembled unit 13 is assembled on the hatch 3 in that the support structure 9 is assembled on the hatch 3, in particular on an end side 37 of the hatch 3. Reference may be made to all explanations pertaining to the drive assembly 1 according to the proposal.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 1 drive assembly
2 motor vehicle
3 hatch
4 drive unit
5 drive
6 drive motors
7 thrust gearbox
8 spindle/spindle nut gearbox
9 support structure
10 supporting pivot axis
11 pivot bearings
12 pivot bearings
13 unit
14 assembly location
15 motor vehicle body
16 door joint
17 drive axis
18 drive shafts
19 thrust element
20 spindle
21 drive housing
22 drive motors
24 intermediate gearbox
25 coupling gearbox
26 coupling gearbox
27 spur gear
28 spur gear
29 spur gear
30 output connector
31 thrust rod 32 support arm
33 support arm
34 base arm
35 support frame
36 hatch assembly
37 end side
38 hatch pivot axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive assembly for use in a motor vehicle and configured to move linearly to adjust a hatch relative to a vehicle body, the drive assembly comprising:
   a drive unit including a drive provided with a first drive motor and a thrust gearbox coupled to the drive; and
   a support structure configured to receive the drive unit and to pivot about a supporting pivot axis defined by the drive,
   wherein the drive unit is connected to the support structure to form a preassembled unit and the support structure is configured to be assembled to an assembly location defined by the hatch or the vehicle body.

2. The drive assembly of claim 1, wherein the drive defines a drive axis the first drive motor extends parallel to the drive axis.

3. The drive assembly of claim 2, wherein the drive unit includes a drive housing, wherein the drive housing receives the drive and the thrust gearbox, and at least two pivot bearings defining the supporting axis.

4. The drive assembly of claim 2, wherein the supporting pivot axis is disposed in a central region of the drive housing with respect to the drive axis.

5. The drive assembly of claim 3, wherein the support structure includes a first support arm disposed on a first pivot bearing of the at least two pivot bearings and a second support arm disposed on the second pivot bearing of the at least two pivot bearings, wherein the first support arm and the second support arm each extend parallel to the drive axis.

6. The drive assembly of claim 5, wherein the support structure includes a base arm and the first and second support arms are connected to one another by the base arm.

7. The drive assembly of claim 6, wherein the base arm is configured to be assembled to the hatch or the vehicle body.

8. The drive assembly of claim 1, wherein the drive includes a second drive motor coupled to the thrust gearbox and drive shafts of the first and second drive motors extend in a direction parallel to the drive axis.

9. The drive assembly of claim 8, wherein the first drive motors has a first nominal torque.

10. The drive assembly of claim 8, further comprising:
    a first coupling gearbox having a first gear ratio; and
    a second coupling gearbox having a second gear ratio, wherein the first coupling gearbox and the second coupling gearbox collectively couple the first drive motor and the second drive motor to the thrust gearbox.

11. The drive assembly of claim 1, wherein the thrust gearbox includes an output connector connected to the spindle and/or the spindle nut gearbox and configured to be pivotally coupled to the vehicle body or the hatch.

12. The drive assembly of claim 1, wherein the support structure at least partially encloses the drive unit.

13. The drive assembly of claim 1, wherein the thrust gearbox is a spindle and/or a spindle nut gearbox.

14. The drive assembly of claim 13, wherein the first drive motor and the spindle are positioned beside one another along the drive axis.

15. The drive assembly of claim 13, wherein the spindle and/or the spindle nut gearbox extend along the drive axis.

16. A hatch assembly for use in a motor vehicle including a vehicle body, the hatch assembly comprising:
    a hatch configured to be adjusted relative to the vehicle body; and
    a drive assembly including,
        a drive unit including a drive provided with a first drive motor and a thrust gearbox coupled to the drive, and
        a support structure configured to receive the drive unit and to pivot about a supporting pivot axis defined by the drive, wherein the support structure is configured to be assembled to the hatch or the motor vehicle body.

17. The hatch assembly of claim 14, wherein a first end of the hatch defines an opening and the drive assembly includes a thrust rod extending through the opening and configured to be pivotally to the vehicle body.

18. A drive assembly for use in a motor vehicle and configured to pivot a hatch relative to a vehicle body, the drive assembly comprising:
    a drive housing defining a pivot axis;
    a rod at least partially disposed in the drive housing and configured to translate between a retracted and an extended position along a drive axis to pivot the hatch relative to the vehicle body;
    a drive motor disposed in the drive housing and coupled to and configured to translate the rod; and
    a U-shaped bracket including a first arm, a second arm, and a base member extending therebetween, wherein the rod extends through the base member and the first arm and the second arm are each pivotally attached to the drive housing and configured pivot about the pivot axis as the hatch pivots relative to the vehicle body.

19. The drive assembly of claim 18, wherein the drive motor includes a drive shaft extending parallel to and spaced apart from the drive axis.

20. The drive assembly of claim 18, wherein the drive housing includes a first end and a second end and the rod extends through the first end, wherein the pivot axis is disposed closer to the second end than the first end.

* * * * *